US009266607B2

(12) United States Patent
Fink et al.

(10) Patent No.: US 9,266,607 B2
(45) Date of Patent: Feb. 23, 2016

(54) COMPOUND HELICOPTER WITH TAIL BOOMS

(71) Applicant: AIRBUS HELICOPTERS DEUTSCHLAND GMBH, Donauworth (DE)

(72) Inventors: Axel Fink, Donauworth (DE); Andrew Winkworth, Donauworth (DE); Ambrosius Weiss, Munich (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 197 days.

(21) Appl. No.: 13/950,517

(22) Filed: Jul. 25, 2013

(65) Prior Publication Data

US 2014/0061366 A1 Mar. 6, 2014

(30) Foreign Application Priority Data

Jul. 27, 2012 (EP) .................................... 12400031

(51) Int. Cl.
*B64C 27/26* (2006.01)
*B64C 39/04* (2006.01)
*B64C 27/82* (2006.01)

(52) U.S. Cl.
CPC ................. *B64C 27/26* (2013.01); *B64C 39/04* (2013.01); *B64C 2027/8236* (2013.01)

(58) Field of Classification Search
CPC ........ B64C 27/02; B64C 27/22; B64C 27/26; B64C 27/82; B64C 2027/8236; B64C 39/04
See application file for complete search history.

(56) References Cited

U.S. PATENT DOCUMENTS

| | | | |
|---|---|---|---|
| 2,405,244 A * | 8/1946 | Stanley | 244/17.21 |
| 3,049,320 A * | 8/1962 | Fletcher | B64C 29/0033 |
| | | | 244/12.4 |
| 3,105,659 A | 10/1963 | Stutz | |
| 3,241,791 A | 3/1966 | Piasecki | |
| 3,331,444 A * | 7/1967 | Toner | A01B 39/08 |
| | | | 416/245 R |
| 3,385,537 A * | 5/1968 | Lichten et al. | 244/6 |
| 3,409,248 A | 11/1968 | Bryan | |
| 3,448,946 A | 6/1969 | Nagatsu | |
| 3,556,674 A * | 1/1971 | Foote | 416/20 R |
| 3,907,219 A * | 9/1975 | Pharris | 244/7 A |
| 4,589,611 A | 5/1986 | Ramme et al. | |

(Continued)

FOREIGN PATENT DOCUMENTS

| | | |
|---|---|---|
| CA | 2316418 A | 2/2001 |
| WO | 8403480 | 9/1984 |

OTHER PUBLICATIONS

European Search Report; European patent application No. EP 12 40 0031; date of completion Dec. 18, 2012.

*Primary Examiner* — Tien Dinh
*Assistant Examiner* — Alexander V Giczy
(74) *Attorney, Agent, or Firm* — Brooks Kushman P.C.

(57) ABSTRACT

The present invention is related to a compound helicopter with a main rotor providing lift, a pair of additional propulsion devices providing thrust and anti-torque and a fixed wing structure on each side providing additional lift during horizontal cruise flight. The propulsion devices are arranged at each side of a fuselage body with two tail booms, one arranged at each side of the fuselage body, each of both tail booms having one of both propulsion devices arranged at its boom rear end. Each of the two tail booms houses an engine and a drive shaft driving the corresponding propulsion device.

10 Claims, 6 Drawing Sheets

(56) References Cited

U.S. PATENT DOCUMENTS

| | | | |
|---|---|---|---|
| 4,928,907 A * | 5/1990 | Zuck | 244/6 |
| 5,042,747 A * | 8/1991 | Rabouyt | 244/17.19 |
| 5,738,301 A * | 4/1998 | Francois et al. | 244/17.19 |
| 5,873,545 A | 2/1999 | Kapin et al. | |
| 6,513,752 B2 | 2/2003 | Carter, Jr. | |
| 2005/0151001 A1 | 7/2005 | Loper | |
| 2009/0121071 A1 * | 5/2009 | Chan | 244/2 |
| 2009/0321554 A1 | 12/2009 | Roesch | |
| 2010/0065677 A1 * | 3/2010 | Ferrier | 244/6 |
| 2011/0036954 A1 * | 2/2011 | Piasecki | B64C 3/385 244/7 A |
| 2011/0114798 A1 | 5/2011 | Gemmati | |
| 2012/0312915 A1 * | 12/2012 | Sonneborn | B64C 27/025 244/17.19 |

* cited by examiner

COMPOUND HELICOPTER WITH TAIL BOOMS

CROSS-REFERENCE TO RELATED APPLICATIONS

This application claims priority to European patent application No. EP 12 400031.6 filed Jul. 27, 2012, the disclosure of which is incorporated in its entirety by reference herein.

BACKGROUND OF THE INVENTION (1) Field of the Invention

The present invention relates to a compound helicopter with a pair of tail booms on the basis of a compound helicopter featuring vertical take-off and thrust capabilities and more specifically, the invention relates to a compound helicopter with a pair of tail booms on the basis of a compound helicopter with a main rotor providing lift during vertical and forward cruise flight operations, a pair of fixed main wings and a pair of additional propulsive devices for lift and thrust during forward cruise flight.

(2) Description of Related Art

The dominant helicopter configuration in the present time is based on Sikorsky's basic design with a main rotor and an auxiliary tail rotor to counter torque. Said conventional helicopters show excellent hover capabilities but suffer from important limitations in terms of horizontal flight speed. These limitations are associated to two aerodynamic phenomena at the main rotor: the retreating blade stall and the maximum blade tip velocity. In general terms, the lift and thrust force capabilities of a helicopter's main rotor decrease with increasing forward speed.

Regarding the increasing demand for aircrafts with vertical take-off capabilities and high-speed and/or high-range capabilities, numerous attempts have been done to combine the efficiency and performance of fixed-wing aircrafts in forward flight and the advantageous hover and vertical take-off capabilities of conventional helicopters. These attempts have been translated in a wide and diverse variety of aircraft configurations. Compound helicopters and convertiplanes are basically the most relevant concepts aiming to overcome the horizontal flight deficiencies of pure helicopters by introducing attributes of fixed-wing aircrafts to helicopters. However, said concepts represent a compromise between conventional helicopters and fixed-wing aircrafts. Said concepts have always to be conveniently adapted to the planned aircraft's mission profile.

Compound helicopters are characterized by a lift compounding, a thrust compounding or by a combination of both and basically aim to off-load the rotor from its simultaneous lifting and propulsive duties to allow for higher forward speeds.

A lift compounding entails adding wings to a pure helicopter hence enabling to increase the load factor of the helicopter and to reach a higher maneuverability. This improves the efficiency of the helicopter at moderately high speeds but at the expense of reduced efficiencies at lower forward speeds and in the hover.

A thrust compound implies the addition of auxiliary propulsion devices to helicopters. This has been typically accomplished either by means of a single or a pair of propellers being driven by driveshafts powered by the main turboshaft engines or by the use of additional engines.

A more extended configuration of a compound helicopter includes both the addition of wings and propulsion units. The lift during cruise is simultaneously provided by the main rotor—in powered condition or in autorotation modus—and wings. The compound helicopter hence overcomes the rotor lift limits by means of the wings and the rotor thrust limits by means of the propellers. As a result, the benefit of a higher load factor is obtained along with potential for higher speed. The use of a pair of thrust propellers enables for a simultaneous torque correction.

A wide variety of said compound architectures have been proposed and some of them developed to a more or less level of maturity but never reaching serial production. A typical configuration with two wing-mounted propellers is described in U.S. Pat. No. 3,105,659, US 2009/0321554 and U.S. Pat. No. 6,513,752. The propulsion device can be a single nose-mounted propeller as disclosed in US 2005/0151001 or a single rear-mounted propeller as disclosed in U.S. Pat. No. 3,241,791, CA 2316418. All said typical configurations feature a pair of main wings located below the main rotor.

A compound helicopter based on a tandem wing configuration, meaning the arrangement of a pair of wings on both of the helicopter's front end and aft end, has been proposed in US 2011/0114798, the propulsion devices being arranged on the front wings. This configuration is characterized by propulsion propellers operating in the turbulent downwash from the main rotor which results to a reduced efficiency and increase noise generation. The location of unducted wing-mounted propellers in the cabin area leads furthermore to serious penalties in terms of passenger safety. In case of a blade separation, the blade has to be retained by additional structural features to avoid a cabin penetration which additionally increase the structural weight. Open rotors being placed close to the doors represent further serious safety penalties during boarding and increase the noise exposure in the cabin.

Typically, the architecture of the aforementioned helicopters with a single main rotor features a main body comprising the cabin, the main rotor and the powerplant with engines, gear box and transmission being placed somewhere on top of the main body above the cabin. The center of gravity is located close to the rotor mast. Since the distribution of payload, passengers and fuel influence the mass distribution and the balance of the helicopter, special care has to be paid to maintain its location within specific limits.

The document U.S. Pat. No. 4,589,611 A discloses a high wing, twin jet gyrodyne having air jet reaction, contrarotating rotors powered with bypass air from twin turbofan engines. Tail pipes from the turbofan engines are disposed parallel to and at opposite sides of a longitudinal duct for discharging bypass air rearwardly. Control valve means can control supply of bypass air selectively to the hollow rotor mast for driving the rotors and to the longitudinal air discharge duct. The aft portions of the tail pipes and of the air discharge duct are connected by a horizontal stabilizer and rudders are located in the slipstream discharged from the tail pipes and the air discharge duct. The wings have drop tip sections providing flotation outriggers in their downwardly projecting positions.

The document U.S. Pat. No. 3,448,946 A discloses a compound helicopter with a pair of tail booms, said compound helicopter comprising a fuselage with a cabin inside, a rear end and a front end. A longitudinal roll axis extends through the rear end and the front end, said roll axis and a pitch axis transversal to said roll axis defining an essentially horizontal plane (X, Y). Said pair of tail booms are longitudinal structures arranged respectively symmetric to opposed sides of the fuselage in the essentially horizontal plane (X, Y) and said tail booms are interconnected with each other at their respective aft ends by means of a horizontal tail plane. Said compound helicopter of the state of the art further comprises a power plant and drive lines. A main rotor is mounted onto the fuselage and driven by said power plant via said drive lines. One pair of fixed main wings is attached to the opposed sides on top of the fuselage in the essentially horizontal plane (X, Y). Two propulsive devices provide thrust and anti-torque. The tail booms are attached to the wing structure and parallel to the longitudinal fuselage axis. Or the tail booms are attached to the fuselage body and sections of the axis of the tail booms are slightly slanted. The propulsion device of said compound architecture is attached to the aft end of the fuselage. Despite the advantage of having undisturbed wings, this propulsion device does not allow for anti-torque capabilities, hence still requiring an additional tail rotor since a configuration with a single fixed pusher propeller, mounted at the aft end of the fuselage is not capable to provide anti-torque.

The document U.S. Pat. No. 3,409,248 A discloses an aircraft with two rotors carrying a wing.

The document U.S. Pat. No. 5,873,545 A discloses a combined flying machine with a fuselage in the form of a central thick wing with a vertical open tunnel, in which there is mounted a lifting rotor. Said machine is also provided with outboard wings and a tail unit. The machine is equipped with a landing device on an air cushion that surrounds an outlet from the tunnel. A power plant of said flying machine comprises two engine modules, disposed from two sides of the tunnel and connected with the lifting rotor and the propulsion propellers. The area of the tunnel cross-section in the plane of the lifting rotor rotation amounts to 0.3 to 0.8 of the area of the landing device air cushion, which ensures a safe landing of the flying machine on an unprepared landing site even with a failure of one of the engine modules.

BRIEF SUMMARY OF THE INVENTION

It is an object of the invention to provide a compound helicopter with a pair of tail booms with additional propulsive and lifting devices for high-speed capabilities whilst achieving an optimal structural architecture, high efficiency aerodynamic behavior, minimized structural weight and compliance with operational and safety requirements.

According to the invention a compound helicopter with a pair of tail booms comprises a fuselage with a cabin inside, a fuselage rear end and a fuselage front end. A longitudinal roll axis extends through the fuselage rear end and the fuselage front end. Said roll axis and a pitch axis transversal to said roll axis define an essentially horizontal plane (X, Y) of the compound helicopter. At least one power plant is provided and a main rotor is mounted on top of the fuselage in a plane essentially parallel to the horizontal plane of the compound helicopter. The main rotor is driven by said power plant. At least one pair of fixed main wings are provided, each fixed main wing of said at least one pair being attached to opposed sides of the fuselage in a further essentially horizontal plane of the compound helicopter. The pair of longitudinally structured tail booms are arranged respectively symmetric to the opposed sides of the fuselage in the essentially horizontal plane (X, Y). Said tail booms are interconnected with each other at their respective aft ends by means of a horizontal tail plane.

At least two propulsive devices such as pusher propellers are mounted at trailing ends of said tail booms behind said fuselage and each propulsive device being opposed to another propulsive device of said at least two propulsive devices relative to the longitudinal roll axis through the fuselage in the essentially horizontal plane (X, Y). Said propulsive devices are—together with said main rotor driven by said engines of said power plant via the associated drive lines. Said at least two propulsive devices of the inventive compound helicopter provide thrust by symmetric operation and anti-torque by asymmetric operation in the essentially horizontal plane. The inventive compound helicopter with a pair of tail booms provides lifting and propulsive compounding for high-speed applications, with additional lift during high-speed operations being provided by the fixed main wings, mounted at each side of the fuselage. The inventive compound helicopter does not need a tail rotor with a rotation plane perpendicular to the essentially horizontal plane (X, Y) and parallel to the longitudinal roll axis. As the propulsion and the anti-torque of the inventive compound helicopter are provided by two pusher propellers, each mounted behind said fuselage at trailing ends at the aft end of each tail boom, the propellers are allocated outside the main rotor's turbulent downwash area, improving the efficiency of the propulsion and the anti-torque. The inventive compound helicopter provides for optimal structural architecture, high efficiency aerodynamic behavior and compliance with operational and safety requirements.

The pusher propellers of the inventive compound helicopter are allocated far away from the fuselage and the boarding area, which is optimal in terms of passenger safety and aircraft operation. In the case of blade loss, there arises no risk of cabin penetration, of hitting the main rotor or the power plant. Cabin noise of the inventive compound helicopter is minimized.

In a preferred embodiment of the invention one engine with associated drive lines of said power plant is arranged in each of the tail booms for driving at least one propulsive device and said main rotor. Said engines of the power plant are preferably housed with the associated drive lines inside said tail booms providing thrust and/or anti-torque. Since the power plant is not arranged on top of the fuselage of the inventive compound helicopter, the upper construction height of the fuselage is minimized reducing drag. The inventive compound helicopter is especially suited for heavy transport, cargo and rescue operations as the use of side mounted tail booms, housing the power plant components, such as engines, gear boxes and drive shafts to the rotors, provide for a large, undisturbed rear cabin compartment and more inner cabin space, preferably throughout the entire fuselage. The inventive compound helicopter allows for the implementation of large rear access doors at the fuselage rear end of the fuselage allowing efficient payload boarding/handling. According to the invention the engines are physically separated from each other hence leading to an improved operational safety. In case of the loss of one engine e.g. due to fire or defragmentation, the other engine remains unaffected. Complex firewalls are no longer required and access to the engines of the power plant of the inventive compound helicopter, as well as its cooling are improved.

In a further preferred embodiment of the invention vertical tail planes are allocated at each tail boom and preferably at the aft end of each tail boom, said vertical tail planes being essentially perpendicular to the essentially horizontal plane (X, Y) and parallel to the roll axis.

In a further preferred embodiment of the invention axis of the tail boom are slanted at least in sections by a maximum angle of 30° with respect to the longitudinal roll axis in the essentially horizontal plane (X, Y).

In a further preferred embodiment of the invention the at least one pair of main wings are fixed to a lower part of the fuselage in the essentially horizontal plane (X, Y) allowing further reduced masses on top of the fuselage close to the rotor mast. The fuselage of the inventive compound helicopter requires consequently less stiffness and strength to react without detrimental deformation of the fuselage to any severe inertia forces arising from a crash with a predominant vertical velocity component and thus the invention allows a fuselage with further reduced structural weight.

In a further preferred embodiment of the invention drive lines from the engines in the respective tail booms towards the main rotor are housed in the fixed main wings.

In a further preferred embodiment of the invention the fixed main wings feature a strong anhedral in order to ensure for a suitable position of the tail booms and the propulsive devices.

In a further preferred embodiment of the invention the vertical position of the tail booms are coincident to the vertical position of the center of gravity of the compound helicopter in order to avoid additional pitch moments from the thrust vectors of the propulsive devices.

In a further preferred embodiment of the invention the vertical tail planes extend downwards, hence providing for a protection of and against the pusher propellers.

BRIEF DESCRIPTION OF THE SEVERAL VIEWS OF THE DRAWINGS

Preferred embodiments of the invention are outlined by way of example with the following description with reference to the attached drawings.

DETAILED DESCRIPTION OF THE INVENTION

The figures show three mutually orthogonal directions X, Y, and Z forming a three-dimensional frame of reference XYZ. A "longitudinal" direction X corresponds to the roll axis 28 inherent to a compound helicopter 1. Another direction Y said to be "transverse" is perpendicular to the roll axis 28 and corresponds to the pitch axis 30 (also known as a control pitch axis or "CPA") inherent to the compound helicopter 1. The X-Y plane is considered to be "horizontal". The third direction Z is the yaw axis 32 inherent to the compound helicopter 1, oriented perpendicular with respect to the horizontal X-Y plane. Corresponding features of the invention are referred to with the same references throughout the figures shown.

Figure 1:
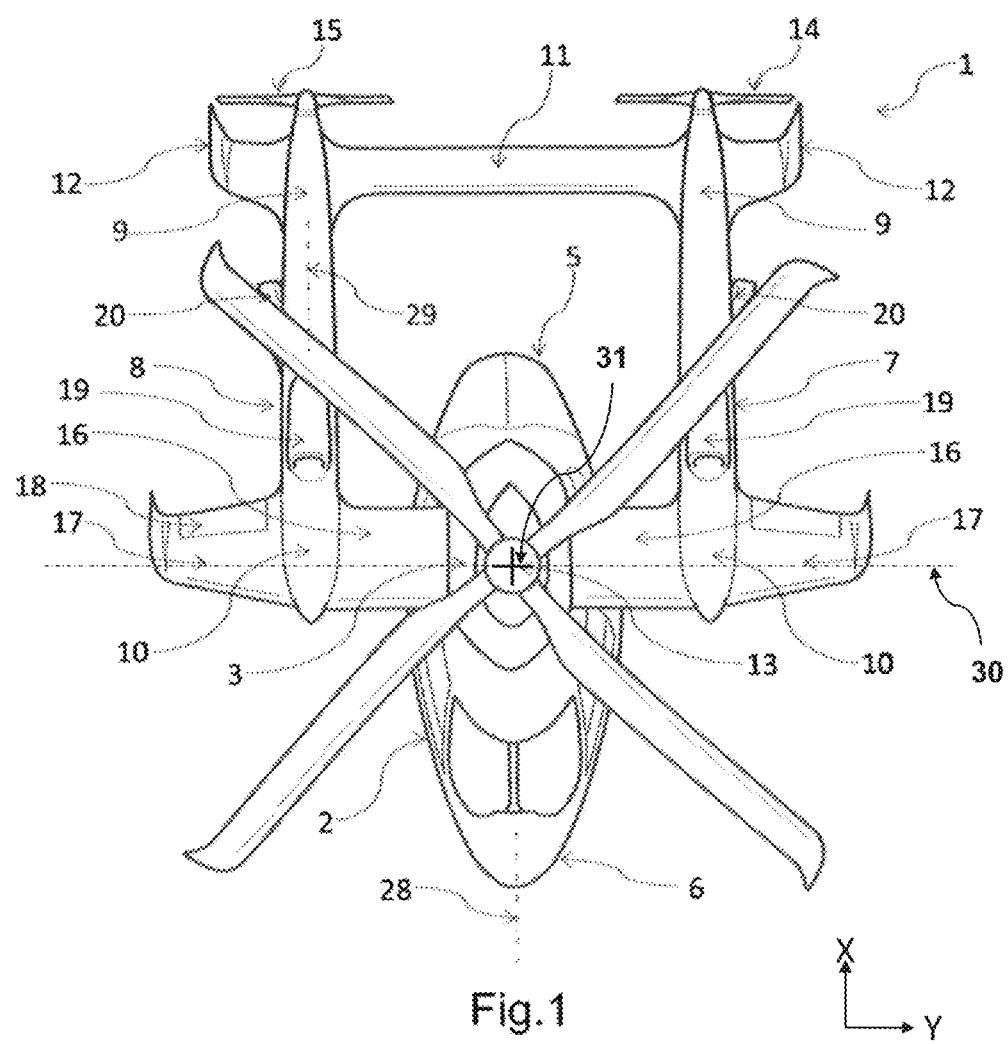
FIG. 1 shows a top overall view of a compound helicopter with a pair of tail booms according to the invention.

According to FIG. 1 the compound helicopter 1 comprises a central main body as fuselage 2 with a cabin inside. The fuselage 2 extends longitudinally along the roll direction X from a fuselage front end 6 to a fuselage rear end 5 and the cabin extends from the fuselage front end 6 of the fuselage 2 to the fuselage rear end 5 of the fuselage 2. The fuselage front end 6 of the fuselage 2 points into the forward direction of the compound helicopter 1.

A pair of fixed main wings ("FMW") providing lift are arranged to opposing sides of the fuselage 2 in the essentially horizontal plane (X, Y). Said fixed main wings are respectively composed of an inboard wing 16 and an outboard wing 17, with the inboard wing 16 being fixed to the fuselage 2 at an upper side 3 next to a hub of a main rotor 13 of the compound helicopter 1, i.e. at least partly longitudinally behind said hub. The fixed main wings are provided with ailerons 18 at trailing edges.

A main rotor 13 providing lift is mounted on top of the fuselage 2 in an essentially horizontal plane parallel to the horizontal X-Y plane with four rotor blades extending radial from the hub.

A pair of tail booms 7, 8 with substantially circular or oval cross-sections are arranged to opposing sides of the fuselage 2 in the horizontal X-Y plane and parallel to the roll axis 28, said tail booms 7, 8 being respectively mounted between the inboard wing 16 and the outboard wing 17. The tail booms 7, 8 extend essentially longitudinal along a boom axis 29 at least partly longitudinal behind the hub, each with a tail boom front end 10 between the inboard wing 16 and the outboard wing 17.

Respective boom rear ends 9 of each of the tail booms 7, 8 are interconnected by an essentially transversal and horizontal tail plane 11. Vertical tail planes 12 essentially perpendicular to the essentially horizontal plane X, Y are arranged outside the boom rear ends 9 of the tail booms 7, 8 at lateral ends of the horizontal tail plane 11.

A pair of propulsive devices 14, 15, i.e. pusher propellers is mounted to the boom rear ends 9 of the tail booms 7, 8 behind a trailing edge of the horizontal tail plane 11 and outside the radius of the main rotor 13. Said two propulsive devices 14, 15 are opposed to each other with symmetry relative to the longitudinal roll axis 28 in the essentially horizontal plane X, Y of the compound helicopter 1. The propulsive devices 14, 15 provide thrust and anti-torque to the compound helicopter 1.

An engine with an air intake 19 and associated drive lines (see FIG. 3) of a power plant are mounted into each of the tail booms 7, 8. Each engine is provided with a forwardly pointing air intake 19 and an exhaust pipe 20 and each engine is connected to the one of the propulsive devices 14, 15 mounted to the boom rear end 9 of the tail boom 7, 8 housing said engine. Each engine is connected to the hub of the main rotor 13.

Figure 2:
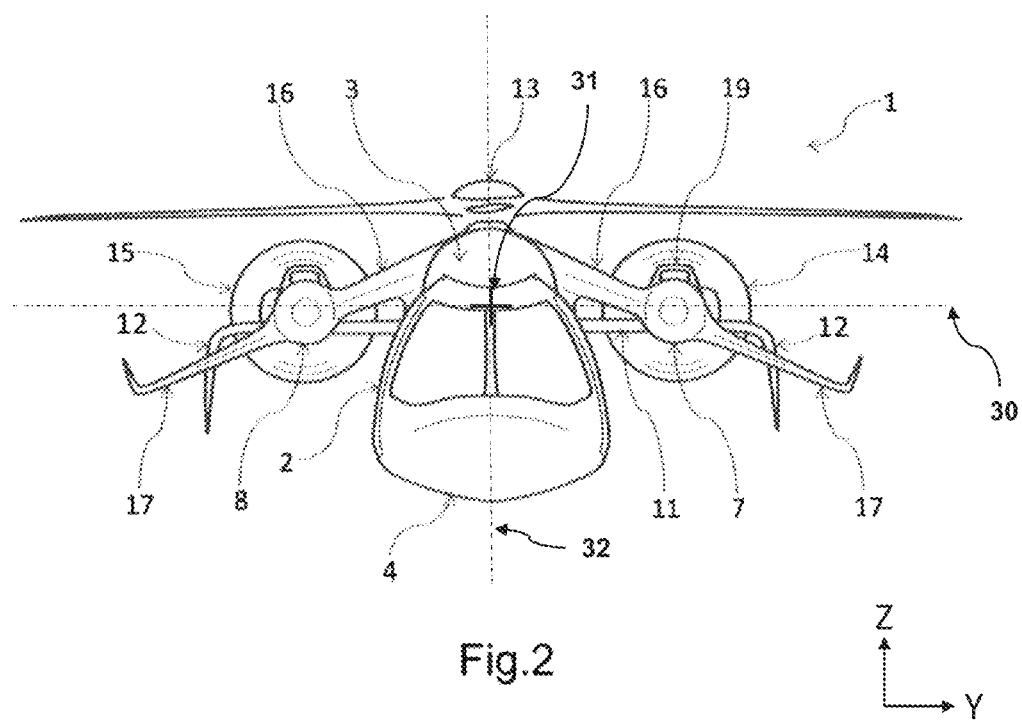
FIG. 2 shows a front view of the compound helicopter with a pair of tail booms according to FIG. 1.

According to FIG. 2 the respective inboard wings 16 of the essentially straight, anhedral main wings are fixed to the fuselage 2 at the upper side 3 next to the main rotor 13 of the compound helicopter 1. Respective free ends of the outboard wings 17 of the fixed main wings are provided with winglets.

The essentially transversal and horizontal tail plane 11 with a vertical tail plane 12 at each lateral wing tip portion is provided with a pair of pusher propellers 14, 15 at the trailing edge of the horizontal tail plane 11 behind the fuselage 2. The pusher propellers 14, 15 are arranged symmetrical with regard to the roll axis of the compound helicopter 1. The center of gravity 31 ("COG") of the compound helicopter 1 is essentially on the level of the transversal axis connecting the left hand pusher propeller 14 with the right hand pusher propeller 15. The engines with the air intakes 19 are respectively mounted coaxial to the pusher propellers 14, 15 inside the tail booms 7, 8 between the outboard wings 17 and the inboard wings 16.

Figure 3:
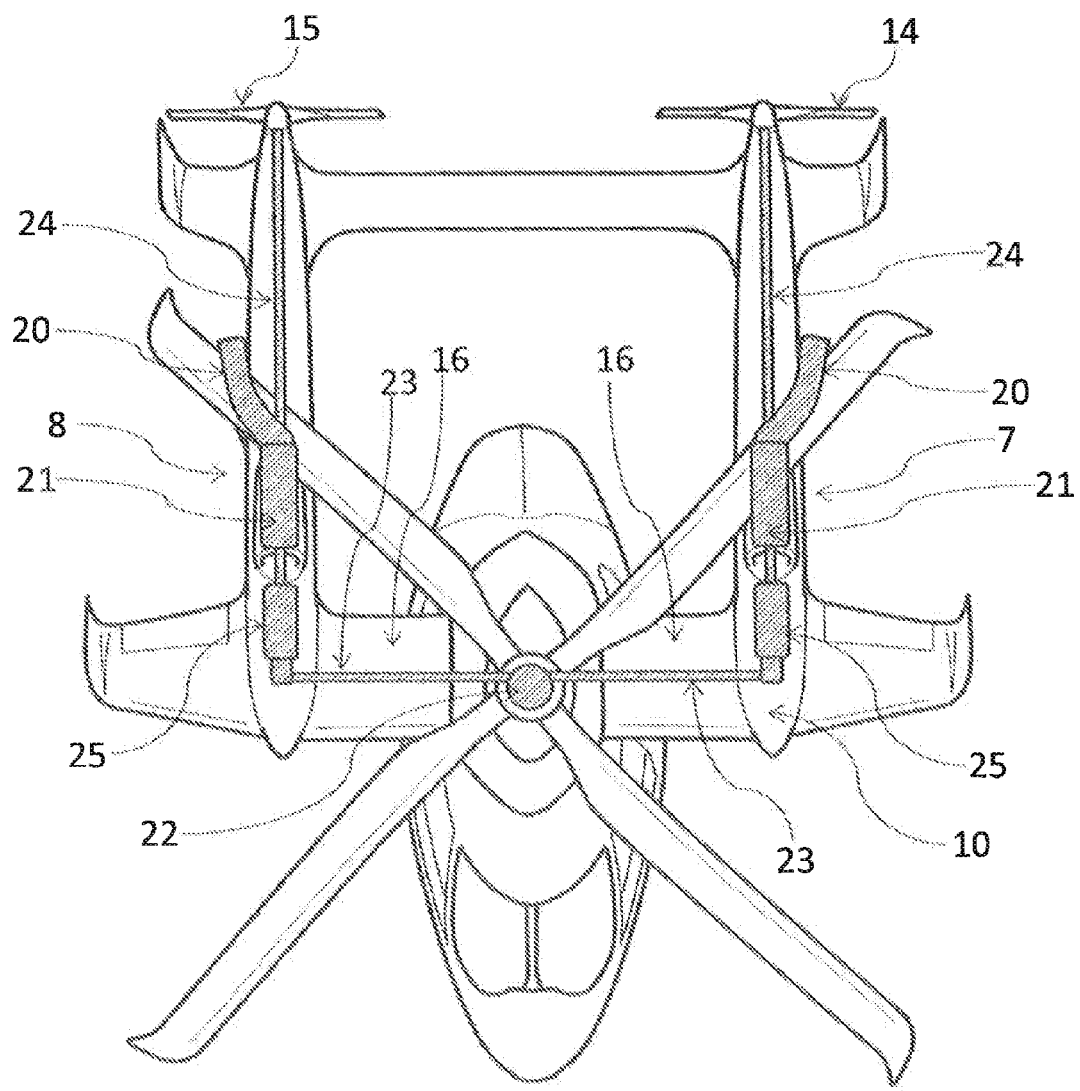
FIG. 3 is a partial cut open top view of the compound helicopter according to FIG. 1.

According to FIG. 3 the main rotor 13 is provided with the rotor blades and a main gear box 22 arranged central below the main rotor 13. Rotor drive shafts 23 inside the inboard wings 16 connect the main gear box 22 with a gear box 25 in each of the respective boom front ends 10 of each of the tail booms 7, 8. The rotor drive shafts 23 are driven by the engines 21 inside each of the tail booms 7, 8 via the respective gear boxes 25. Propeller drive shafts 24, each driven by the one of the engines 21 and housed inside each of the tail booms 7, 8 drive each one of the respective pusher propellers 14, 15. The propeller drive shafts 24 are aligned with the engines 21. The rotor drive shafts 23 are each connected to the respective gear boxes 25 and essentially perpendicular with regard to the propeller drive shafts 24.

Exhaust pipes 20 are directed laterally outside relative to the tail booms 7, 8.

Figure 4:
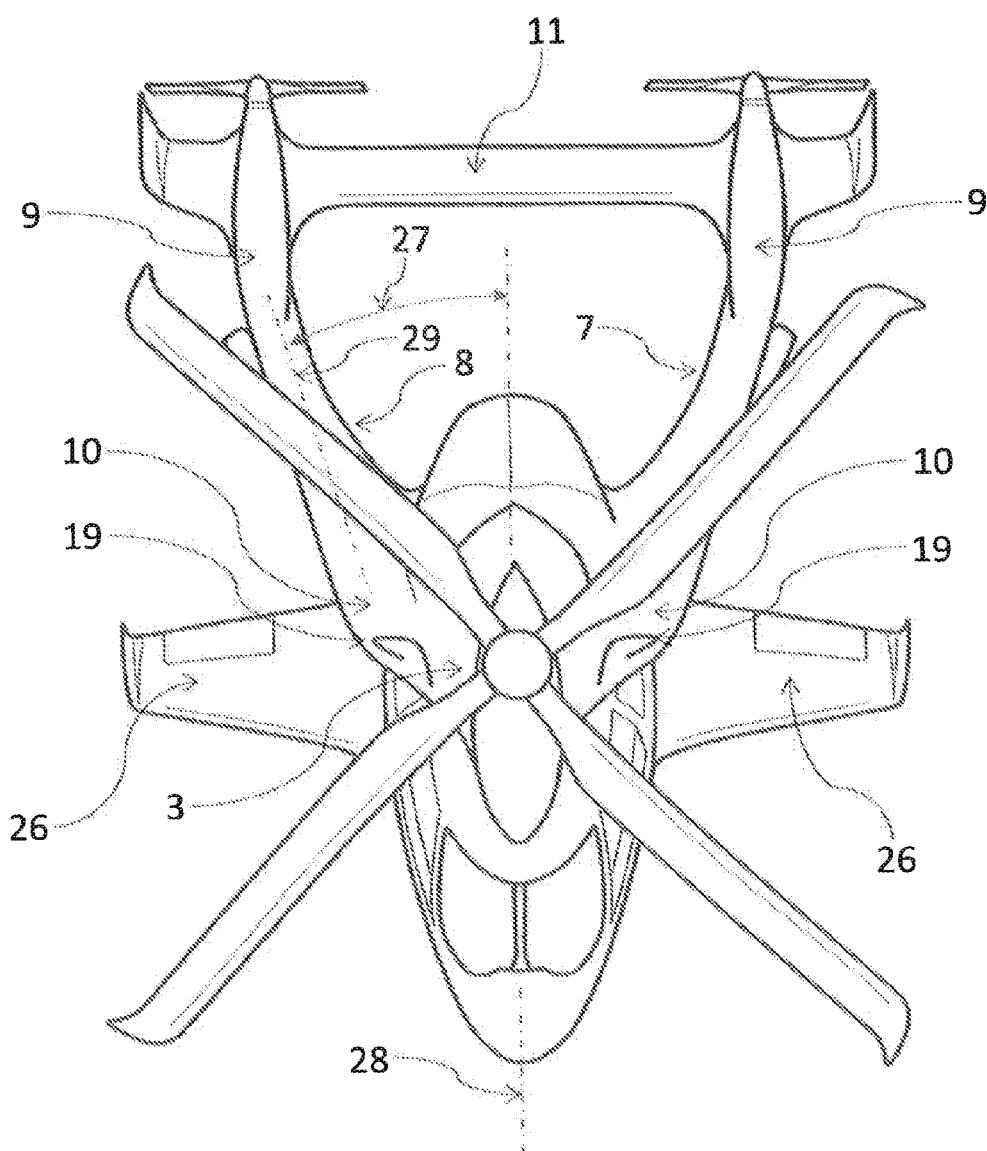
FIG. 4 is a top overall view of an alternative compound helicopter with a pair of tail booms according to the invention.
Figure 5:
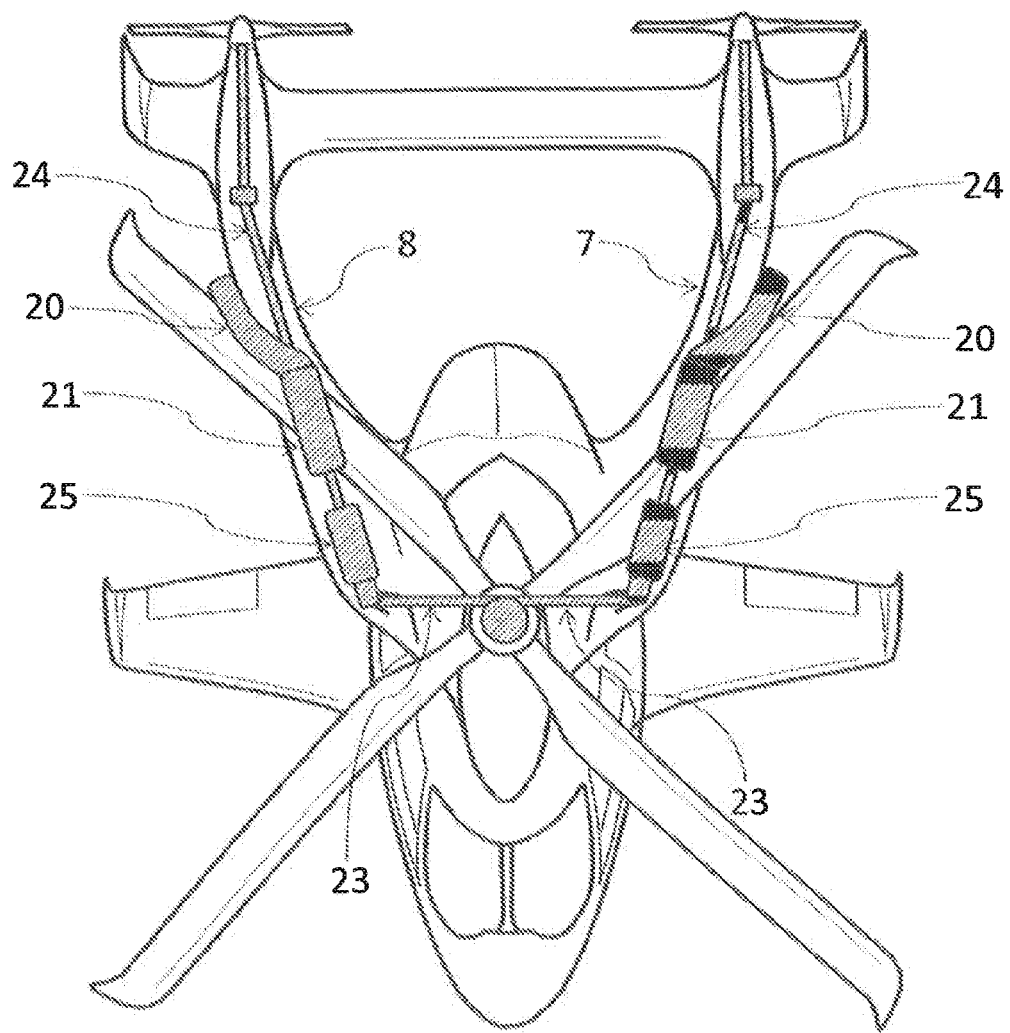
FIG. 5 is a partial cut open top view of the alternative compound helicopter according to FIG. 4.
Figure 6:
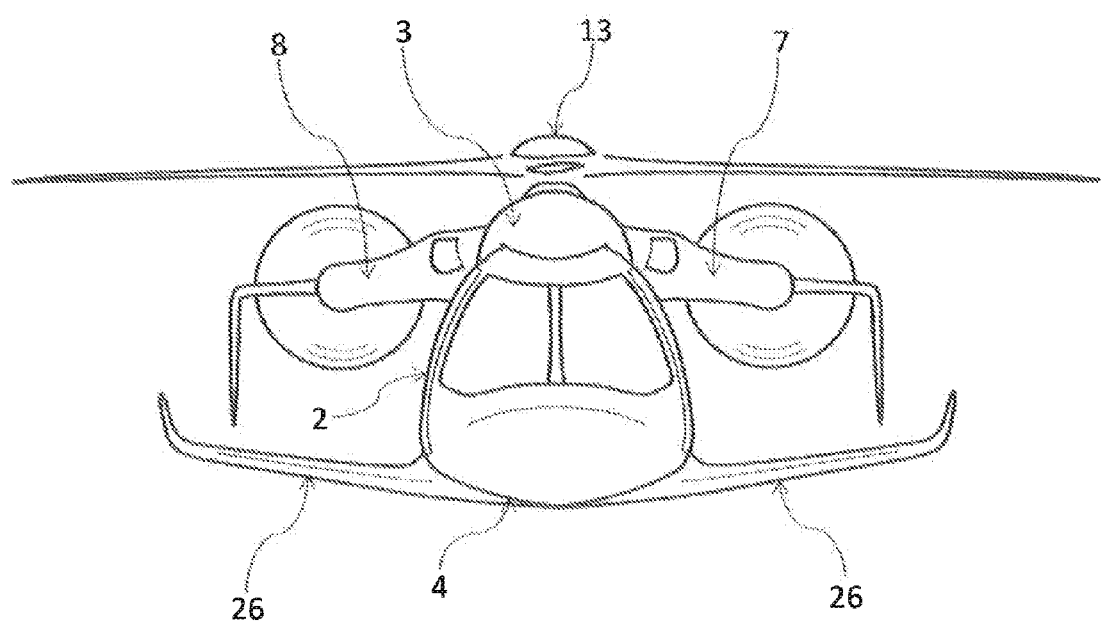
FIG. 6 is a front view of the front section of the alternative compound helicopter according to FIG. 4.

According to FIGS. 4, 5 and 6 the main wings 26 are fixed to a lower side 4 of the fuselage 2 of the compound helicopter 1. The pair of tail booms 7, 8 is provided at rear ends with pusher propellers arranged to opposing sides of the fuselage 2 in the horizontal X-Y plane.

An inside section of each tail boom 7, 8 is attached directly to an upper side 3 of the fuselage 2 of the compound helicopter 1. Each of said tail booms 7, 8 has an axis 29 slanted overall with an angle 27 with regard to the roll axis 28 of the compound helicopter 1. The boom rear ends 9 of said tail booms 7, 8 are essentially parallel to the roll axis 28. The propeller drive shafts 24 are each aligned in a section of the associated tail boom 7, 8 with the respective engines 21 with respective redirection elements for the sections in the respective boom rear ends 9 of each tail boom 7, 8. The rotor drive shafts 23 are each connected with the respective gear boxes 25.

REFERENCE LIST 1 compound helicopter
2 fuselage
3 upper side
4 lower side
5 fuselage rear end
6 fuselage front end
7, 8 tail boom
9 boom rear end
10 boom front end
11 horizontal tail plane
12 vertical tail plane
13 main rotor
14 propulsion device
15 propulsion device
16 inboard wing
17 outboard wing
18 aileron
19 air intake
20 exhaust pipe
21 engine
22 main gearbox
23 rotor drive shaft
24 propeller drive shaft
25 gearbox
26 low wing
27 angle
28 roll axis
29 boom axis
30 pitch axis
31 center of gravity
32 yaw axis

What is claimed is:

1. A compound helicopter with a pair of tail booms comprising:
    a fuselage with a cabin inside, a fuselage rear end and a fuselage front end;
    a longitudinal roll axis extending through the fuselage rear end and the fuselage front end, the roll axis and a pitch axis transversal to the roll axis defining an essentially horizontal plane (X, Y);
    the pair of tail booms being longitudinal structures arranged respectively symmetric to opposed sides of the fuselage in the essentially horizontal plane (X, Y) and the tail booms being interconnected with each other a respective boom rear end of each respective tail boom by means of an essentially horizontal tail plane;
    at least one power plant with a plurality of drive lines;
    a main rotor mounted onto the fuselage and driven by the power plant,
    at least one pair of fixed main wings attached to the opposed sides of the fuselage, and
    at least two propulsive devices, the at least two propulsive devices providing thrust and/or anti-torque;
    wherein a first respective propulsive device of the at least two propulsive devices is disposed on a port side relative to the longitudinal roll axis and a second respective propulsion device of the at least two propulsive devices is disposed on a starboard side relative to the longitudinal roll axis, the first respective propulsion device and the second respective propulsion device being disposed in the essentially horizontal plane (X, Y),
        the at least two propulsive devices are pusher propellers mounted at trailing ends of the tail booms behind the fuselage and
        the at least two propulsive devices are driven by the power plant via the drive lines,
        wherein the power plant comprises two engines, one of the engines with associated drive lines being arranged in each of the tail booms.

2. The compound helicopter according to claim 1, wherein the cabin extends essentially throughout the entire interior of the fuselage.

3. The compound helicopter according to claim 1, wherein vertical tail planes are allocated at the boom rear ends of the tail booms.

4. The compound helicopter according to claim 1, wherein the fuselage is provided with a cargo door at the fuselage rear end of the fuselage.

5. The compound helicopter according to claim 1, wherein the axes of the tail booms are slanted at least in sections by a maximum angle of 30° with respect to the longitudinal roll axis.

6. The compound helicopter according to claim 1, wherein the at least one pair of main wings are fixed to a lower side of the fuselage.

7. The compound helicopter according to claim 1, wherein rotor drive lines are housed in the fixed main wings.

8. The compound helicopter according to claim 1, wherein the fixed main wings feature anhedral of maximum 30° with respect to the pitch axis.

9. The compound helicopter according to claim 1, wherein the vertical position of each tail boom is coincident to the vertical position of a center of gravity of the compound helicopter.

10. The compound helicopter according to claim 3, wherein the vertical tail planes extend downwards.

* * * * *